(12) United States Patent
Proksch

(10) Patent No.: US 8,448,501 B2
(45) Date of Patent: May 28, 2013

(54) MULTIPLE FREQUENCY ATOMIC FORCE MICROSCOPY

(75) Inventor: Roger B Proksch, Santa Barbara, CA (US)

(73) Assignees: Oxford Instruments PLC, Oxfordshire (GB); Oxford Instruments AFM Inc., Pleasanton, CA (US)

( * ) Notice: Subject to any disclaimer, the term of this patent is extended or adjusted under 35 U.S.C. 154(b) by 547 days.

(21) Appl. No.: 12/582,045

(22) Filed: Oct. 20, 2009

(65) Prior Publication Data

US 2010/0043107 A1 Feb. 18, 2010

Related U.S. Application Data

(63) Continuation of application No. 11/544,130, filed on Oct. 5, 2006, now Pat. No. 7,603,891.

(60) Provisional application No. 60/795,151, filed on Apr. 25, 2006, provisional application No. 60/811,264, filed on Jun. 5, 2006, provisional application No. 60/839,749, filed on Aug. 24, 2006.

(51) Int. Cl.
*G01B 5/28* (2006.01)
*G01Q 10/00* (2010.01)
*G01Q 60/32* (2010.01)

(52) U.S. Cl.
USPC .................................. 73/105; 850/1; 850/37

(58) Field of Classification Search
USPC ............................... 73/105; 850/1, 32, 37, 39
See application file for complete search history.

(56) References Cited

U.S. PATENT DOCUMENTS

| | | |
|---|---|---|
| RE33,937 E | 5/1992 | Schubert |
| 5,266,896 A | 11/1993 | Rugar et al. |
| 5,267,471 A | 12/1993 | Abraham et al. ............... 73/105 |
| 5,444,244 A | 8/1995 | Kirk et al. |
| 5,477,732 A | 12/1995 | Yasue et al. |
| 5,483,822 A | 1/1996 | Albrecht et al. |
| 5,503,010 A | 4/1996 | Yamanaka |
| 5,519,212 A | 5/1996 | Elings et al. |
| 5,646,339 A | 7/1997 | Bayer et al. |
| 5,742,377 A | 4/1998 | Minne et al. |
| 5,763,768 A | 6/1998 | Henderson et al. |
| 5,804,708 A | 9/1998 | Yamanaka et al. |
| 5,866,805 A | 2/1999 | Han et al. |
| 5,877,412 A | 3/1999 | Muramatsu et al. |
| 5,883,705 A | 3/1999 | Minne et al. |
| 5,924,845 A | 7/1999 | Bagley et al. |
| 5,994,820 A | 11/1999 | Kleindiek |
| 6,006,593 A | 12/1999 | Yamanaka ..................... 73/105 |
| RE36,488 E | 1/2000 | Elings et al. |
| 6,051,833 A | 4/2000 | Yasutake |
| 6,075,585 A | 6/2000 | Minne et al. |
| 6,079,255 A | 6/2000 | Binnig et al. |
| 6,249,000 B1 | 6/2001 | Muramatsu et al. |

(Continued)

OTHER PUBLICATIONS

Abraham. David W. et al. "Lateral dopant profiling in semiconductors by force microscopy using capacitive detection" J. Vac. Sci. Technol B 9(2) Mar./Apr. 1991, 703-706.

*Primary Examiner* — Daniel Larkin
(74) *Attorney, Agent, or Firm* — Law Office of Scott C. Harris, Inc.

(57) ABSTRACT

An apparatus and technique for extracting information carried in higher eigenmodes or harmonics of an oscillating cantilever or other oscillating sensors in atomic force microscopy and related MEMs work is described.

19 Claims, 7 Drawing Sheets

U.S. PATENT DOCUMENTS

| | | |
|---|---|---|
| 6,298,715 B1 | 10/2001 | Thomson et al. |
| 6,349,591 B1 | 2/2002 | Fretigny et al. |
| 6,452,170 B1 | 9/2002 | Zypman et al. |
| 6,465,782 B1 | 10/2002 | Kendall |
| 6,578,410 B1 | 6/2003 | Israelachvili |
| 6,767,696 B2 | 7/2004 | Howald et al. |
| 6,823,724 B1 | 11/2004 | Kobayashi et al. |
| 6,845,655 B2 * | 1/2005 | van der Weide et al. ........ 73/105 |
| 6,880,386 B1 | 4/2005 | Krotil et al. |
| 6,935,167 B1 | 8/2005 | Sahin et al. .................... 73/105 |
| 7,055,378 B2 * | 6/2006 | Su et al. ......................... 73/105 |
| 7,089,787 B2 | 8/2006 | Sahin et al. |
| 7,093,509 B2 | 8/2006 | Shao et al. |
| 7,107,825 B2 | 9/2006 | Degertekin et al. ............. 73/105 |

* cited by examiner

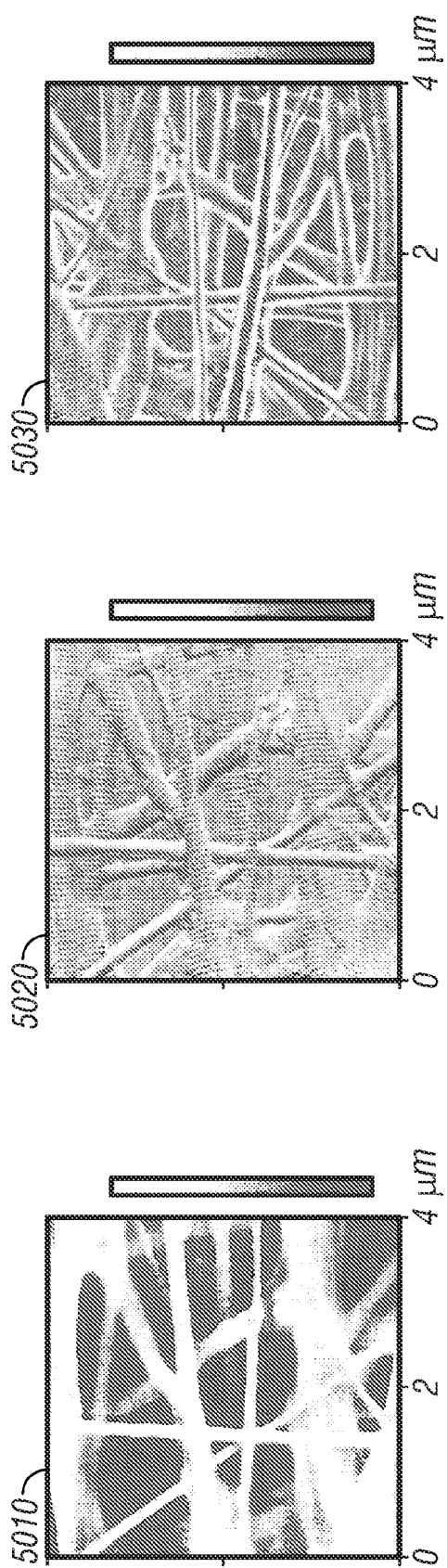

MULTIPLE FREQUENCY ATOMIC FORCE MICROSCOPY

CROSS-REFERENCE TO RELATED APPLICATIONS

This application is a continuation application of U.S. Ser. No. 11/544,130 filed Oct. 5, 2006, now U.S. Pat. No. 7,603, 891 issued Oct. 20, 2009, which claims priority of U.S. Provisional Application No. 60/795,151, filed on Apr. 25, 2006, U.S. Provisional Application No. 60/811,264, filed on Jun. 5, 2006, and U.S. Provisional Application No. 60/839,749, filed on Aug. 24, 2006, the disclosures of which are incorporated fully herein by reference.

BACKGROUND OF THE INVENTION

For the sake of convenience, the current description focuses systems and techniques that may be realized in a particular embodiment of cantilever-based instruments, the atomic force microscope (AFM). Cantilever-based instruments include such instruments as AFMs, 3D molecular force probe instruments, high-resolution profilometers (including mechanical stylus profilometers), surface modification instruments, chemical or biological sensing probes, and micro-actuated devices. The systems and techniques described herein may be realized in such other cantilever-based instruments.

An AFM is a device used to produce images of surface topography (and/or other sample characteristics) based on information obtained from scanning (e.g., rastering) a sharp probe on the end of a cantilever relative to the surface of the sample. Topographical and/or other features of the surface are detected by detecting changes in deflection and/or oscillation characteristics of the cantilever (e.g., by detecting small changes in deflection, phase, frequency, etc., and using feedback to return the system to a reference state). By scanning the probe relative to the sample, a "map" of the sample topography or other sample characteristics may be obtained.

Changes in deflection or in oscillation of the cantilever are typically detected by an optical lever arrangement whereby a light beam is directed onto the cantilever in the same reference frame as the optical lever. The beam reflected from the cantilever illuminates a position sensitive detector (PSD). As the deflection or oscillation of the cantilever changes, the position of the reflected spot on the PSD changes, causing a change in the output from the PSD. Changes in the deflection or oscillation of the cantilever are typically made to trigger a change in the vertical position of the cantilever base relative to the sample (referred to herein as a change in the Z position, where Z is generally orthogonal to the XY plane defined by the sample), in order to maintain the deflection or oscillation at a constant pre-set value. It is this feedback that is typically used to generate an AFM image.

AFMs can be operated in a number of different sample characterization modes, including contact mode where the tip of the cantilever is in constant contact with the sample surface, and AC modes where the tip makes no contact or only intermittent contact with the surface.

Actuators are commonly used in AFMs, for example to raster the probe or to change the position of the cantilever base relative to the sample surface. The purpose of actuators is to provide relative movement between different parts of the AFM; for example, between the probe and the sample. For different purposes and different results, it may be useful to actuate the sample, the cantilever or the tip or some combination of both. Sensors are also commonly used in AFMs. They are used to detect movement, position, or other attributes of various components of the AFM, including movement created by actuators. For the purposes of the specification, unless otherwise specified, the term "actuator" refers to a broad array of devices that convert input signals into physical motion, including piezo activated flexures, piezo tubes, piezo stacks, blocks, bimorphs, unimorphs, linear motors, electrostrictive actuators, electrostatic motors, capacitive motors, voice coil actuators and magnetostrictive actuators, and the term "position sensor" or "sensor" refers to a device that converts a physical parameter such as displacement, velocity or acceleration into one or more signals such as an electrical signal, including capacitive sensors, inductive sensors (including eddy current sensors), differential transformers (such as described in co-pending applications US20020175677A1 and US20040075428A1, Linear Variable Differential Transformers for High Precision Position Measurements, and US20040056653A1, Linear Variable Differential Transformer with Digital Electronics, which are hereby incorporated by reference in their entirety), variable reluctance, optical interferometry, optical deflection detectors (including those referred to above as a PSD and those described in co-pending applications US20030209060A1 and US20040079142A1, Apparatus and Method for Isolating and Measuring Movement in Metrology Apparatus, which are hereby incorporated by reference in their entirety), strain gages, piezo sensors, magnetostrictive and electrostrictive sensors.

In both the contact and AC sample-characterization modes, the interaction between the stylus and the sample surface induces a discernable effect on a probe-based operational parameter, such as the cantilever deflection, the cantilever oscillation amplitude, the phase of the cantilever oscillation relative to the drive signal driving the oscillation or the frequency of the cantilever oscillation, all of which are detectable by a sensor. In this regard, the resultant sensor-generated signal is used as a feedback control signal for the Z actuator to maintain a designated probe-based operational parameter constant.

In contact mode, the designated parameter may be cantilever deflection. In AC modes, the designated parameter may be oscillation amplitude, phase or frequency. The feedback signal also provides a measurement of the sample characteristic of interest. For example, when the designated parameter in an AC mode is oscillation amplitude, the feedback signal may be used to maintain the amplitude of cantilever oscillation constant to measure changes in the height of the sample surface or other sample characteristics.

The periodic interactions between the tip and sample in AC modes induces cantilever flexural motion at higher frequencies. The results of these interactions probe a variety of tip and sample mechanical properties including conservative and dissipative interactions. The prior art has discussed the flexural response of a cantilever at higher frequencies as nonlinear interactions between the tip and the sample. Prior art has explored the amplitude and phase at numerous higher oscillation frequencies and related these signals to the mechanical properties of the sample.

Unlike the plucked guitar strings of elementary physics classes, cantilevers normally do not have higher oscillation frequencies that fall on harmonics of the fundamental frequency. The first three modes of a simple diving board cantilever, for example, are at the fundamental resonant frequency ($f_0$), 6.19 $f_0$ and 17.5 $f_0$. An introductory text in cantilever mechanics has many more details. Through careful engineering of cantilever mass distributions, a class of cantilevers has been designed hose higher modes do fall on higher harmonics of the fundamental resonant frequency. Cantilevers driven at the fundamental exhibit enhanced contrast, based on their simulations on mechanical properties of the sample surface. This approach is has the disadvantage of requiring costly and difficult to manufacture special cantilevers.

In some very early work, cantilever was at two frequencies. The cantilever response at the lower, non-resonant frequency was used as a feedback signal to control the surface tracking and produced a topographic image of the surface. The response at the higher frequency was used to characterize differences in the non-contact forces above the Si and photoresist on a patterned sample.

Recently, Rodriguez and Garcia published a theoretical simulation of a non-contact, attractive mode technique where the cantilever was driven at its two lowest eigenfrequencies. In their simulations, they observed that the phase of the second mode had a strong dependence on the Hamaker constant of the material being imaged, implying that this technique could be used to extract chemical information about the surfaces being imaged. Crittenden et al. have explored using higher harmonics for similar purposes.

SUMMARY OF THE INVENTION

Cantilevers are continuous flexural members with a continuum of vibrational modes. The present invention, Multiple Frequency Atomic Force Microscopy, describes different apparatus and methods for driving the cantilever simultaneously at or near two or more of the cantilever vibrational eigenmodes and the useful information revealed in the resulting images and measurements.

Past work with AC mode AFMs has been concerned with higher vibrational modes in the cantilever, with linear interactions between the tip and the sample. The present invention, however, is centered around non-linear interactions between the tip and sample that couple energy between two or more different cantilever vibrational modes, usually kept separate in the case of linear interactions. Observing the response of the cantilever at two or more different vibrational modes has some advantages in the case of even purely linear interactions however. For example, if the cantilever is interacting with a sample that has some frequency dependent property, this may show itself as a difference in the mechanical response of the cantilever at the different vibrational modes.

DESCRIPTION OF THE PREFERRED EMBODIMENTS

Figure 1:
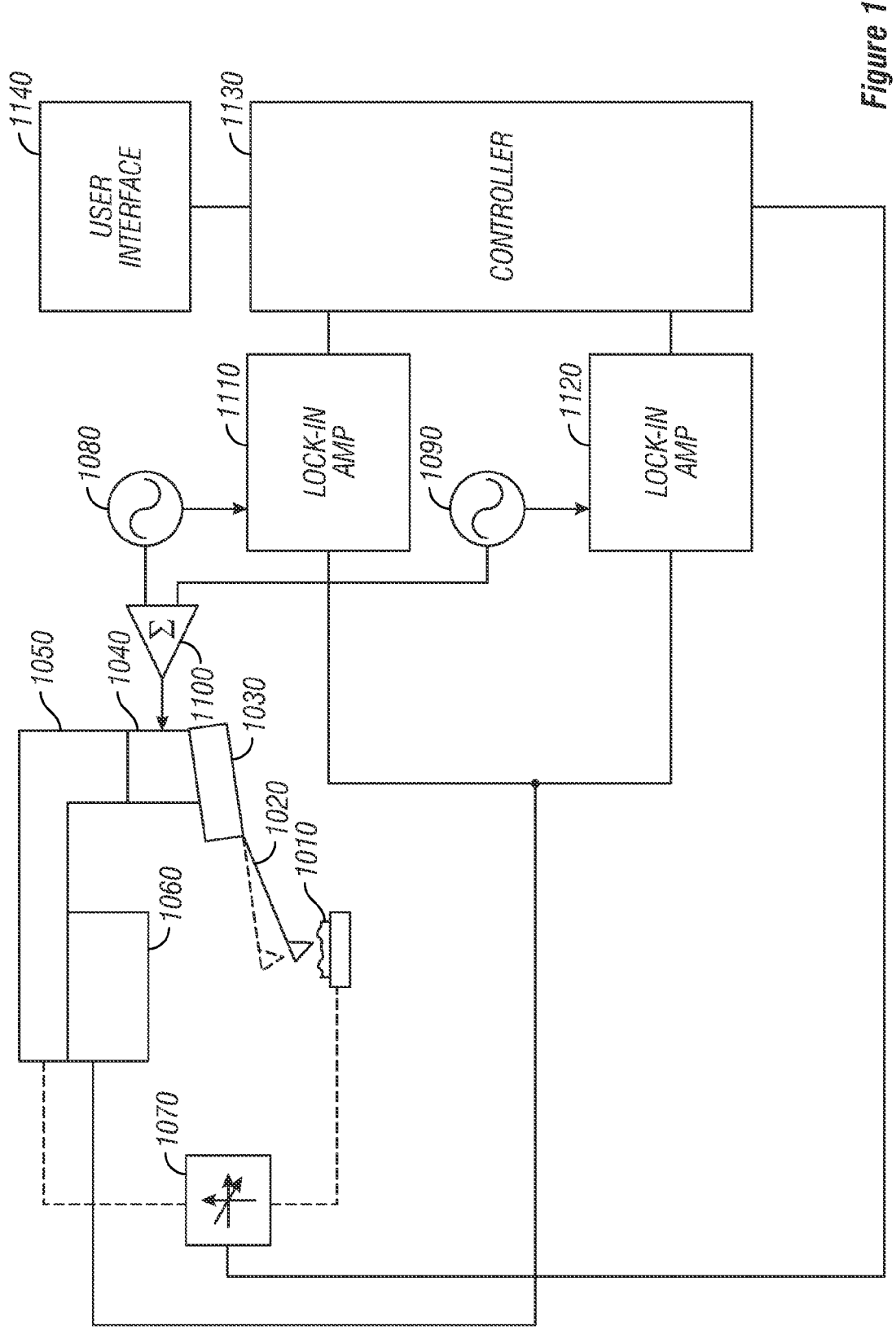
FIG. 1 Preferred embodiment for probing multiple eigenmodes of a cantilever.

FIG. 1 is a block diagram of a preferred embodiment of an apparatus for probing multiple eigenmodes of a cantilever in accordance with the present invention. The sample 1010 is positioned below the cantilever probe 1020. The chip of the cantilever probe 1030 is driven by a mechanical actuator 1040, preferably a piezoelectric actuator, but other methods to induce cantilever motion known to those versed in the art could also be used. The motion of the cantilever probe 1030 relative to the frame of the microscope 1050 is measured with a detector 1060, which could be an optical lever or another method known to those versed in the art. The cantilever probe 1030 is moved relative to the sample 1010 by a scanning apparatus 1070, preferably a piezo/flexure combination, but other methods known to those versed in the art could also be used.

The motion imparted to the cantilever chip 1030 by actuator 1040 is controlled by excitation electronics that include at least two frequency synthesizers 1080 and 1090. There could be additional synthesizers if more than two cantilever eigenmodes are to be employed. The signals from these frequency synthesizers could be summed together by an analog circuit element 1100 or, preferably, a digital circuit element that performs the same function. The two frequency synthesizers 1080 and 1090 provide reference signals to lockin amplifiers 1110 and 1120, respectively. In the case where more than two eigenmodes are to be employed, the number of lockin amplifiers will also be increased. As with other electronic components in this apparatus, the lockin amplifiers 1110 and 1120 can be made with analog circuitry or with digital circuitry or a hybrid of both. For a digital lockin amplifier, one interesting and attractive feature is that the lockin analysis can be performed on the same data stream for both eigenmodes. This implies that the same position sensitive detector and analog to digital converter can be used to extract information at the two distinct eigenmodes.

The lockin amplifiers could also be replaced with rms measurement circuitry where the rms amplitude of the cantilever oscillation is used as a feedback signal There are a number of variations in the FIG. 1 apparatus that a person skilled in the art could use to extract information relative to the different eigenmodes employed in the present invention. Preferably, a direct digital synthesizer (DDS) could be used to create sine and cosine quadrature pairs of oscillating voltages, each at a frequency matched to the eigenmodes of the cantilever probe 1030 that are of interest. Then the amplitude and phase of each eigenmode can be measured and used in a feedback loop calculated by the controller 1130 or simply reported to the user interface 1140 where it is displayed, stored and/or processed further in an off-line manner. Instead of, or in addition to, the amplitude and phase of the cantilever motion, the quadrature pairs, usually designated x and y, can be calculated and used in a manner similar to the amplitude and phase.

In one method of using the FIG. 1 apparatus, the cantilever is driven at or near two or more resonances by the single "shake" piezo. Operating in a manner similar to AC mode where the cantilever amplitude is maintained constant and used as a feedback signal, but employing the teachings of the present invention, there are now a number of choices for the feedback loop. Although the work here will focus on using the amplitude of the fundamental ($A_0$), we were able to successfully image using one of the higher mode amplitudes ($A_i$) as a feedback signal as well as a sum of all the amplitudes $A_0+A_1+\ldots$. One can also choose to exclude one or more modes from such a sum. So for example, where three modes are employed, the sum of the first and second could be used to operate the feedback loop and the third could be used as a carry along signal.

Because higher eigenmodes have a significantly higher dynamic stiffness, the energy of these modes can be much larger that that of lower eigenmodes.

The method may be used to operate the apparatus with one flexural mode experiencing a net attractive force and the other a net repulsive force, as well as operating with each mode experiencing the same net sign of force, attractive or repulsive. In this manner, it is possible to separate short and long range forces, providing additional information about sample properties and allowing, for example, the simultaneous and separated measurement of topography and magnetic or electric fields.

One preferred technique for using the aforesaid method is as follows. First, excite the probe tip at or near a resonant frequency of the cantilever with a free amplitude $A_{10}$ small enough so that the cantilever will interact with the surface in a non-contact mode; that is the phase $p_1$ will be greater than $p_{10}$. In this mode, the cantilever is not touching the surface; it turns around before it interacts with significant repulsive forces.

Second, reduce the relative distance in the Z direction between the base of the cantilever and the sample surface so that the amplitude of the probe tip $A_1$ is affected by the proximity of the sample surface and setup a feedback loop that controls the distance between the base of the cantilever and the sample surface so that the amplitude maintained at an essentially constant value during scanning.

Third, keeping the first eigenmode drive and surface controlling feedback loop with the same values, excite a second eigenmode of the cantilever at an amplitude $A_2$. Increase $A_2$ until the second eigenmode phase $p_2$ shows that the cantilever eigenmode is interacting with predominantly repulsive forces; that is, that $p_2$ is less than $p_{20}$, the free second eigenmode phase. This second amplitude $A_2$ is not included in the feedback loop and should be allowed to freely roam over a large range of values. In fact, it is typically better if variations in $A_2$ can be as large as possible, ranging from 0 to $A_{20}$, the free second eigenmode amplitude.

Fourth, the feedback amplitude and phase $A_1$ and $p_1$ as well as the carry along second eigenmode amplitude and phase should be measured and displayed.

Alternatively, the drive amplitude and/or phase of the second frequency can be continually adjusted to maintain the second amplitude and/or phase at an essentially constant value. In this case, it is useful to display and record the drive amplitude and/or frequency required to maintain the second amplitude and/or phase at an essentially constant value.

A second preferred technique for using the aforesaid method follows the first two steps of first preferred technique just described and then continues with the following two steps:

Third, keeping the first eigenmode drive and surface controlling feedback loop with the same values, excite a second eigenmode (or harmonic) of the cantilever at an amplitude $A_2$. Increase $A_2$ until the second eigenmode phase $p_2$ shows that the cantilever eigenmode is interacting with predominantly repulsive forces; that is, that $p_2$ is less than $p_{20}$, the free second eigenmode phase. At this point, the second eigenmode amplitude $A_2$ should be adjusted so that the first eigenmode phase $p_1$ becomes predominantly less than the free phase $p_{10}$. In this case, the adjustment of the second eigenmode amplitude $A_2$ has induced the first eigenmode of the cantilever to interact with the surface in a repulsive manner. As with the first preferred technique, the second amplitude $A_2$ in not used in the tip-surface distance feedback loop and should be allowed range widely over many values.

Fourth, the feedback amplitude and phase $A_1$ and $p_1$ as well as the carry along second eigenmode amplitude and phase should be measured and displayed.

Either of the preferred techniques just described could be performed in a second method of using the FIG. 1 apparatus where the phase of the oscillating cantilever is used in a feedback loop where the oscillation frequency is varied to maintain phase essentially constant. In this case, it is preferable to use the oscillation frequency as an input into a Z-feedback loop that controls the cantilever-sample separation.

Relative changes in various parameters such as the amplitude and phase or in-phase and quadrature components of the cantilever at these different frequencies could also be used to extract information about the sample properties.

A third preferred technique for using the aforesaid method provides an alternative for conventional operation in a repulsive mode, that is where the tip is experiencing a net repulsive force. The conventional approach for so operating would be to use a large amplitude in combination with a lower setpoint, and a cantilever with a very sharp tip. Using the third preferred technique, however, the operator begins, just as with the first two techniques, by choosing an amplitude and setpoint for the fundamental eigenmode that is small enough to guarantee that the cantilever is experiencing attractive forces, that is, that the cantilever is in non-contact mode. As noted before, this operational mode can be identified by observing the phase of the cantilever oscillation. In the non-contact case, the phase shift is positive, implying that the resonant frequency has been lowered. With these conditions on the first eigenmode, the second eigenmode excitation can be introduced and the amplitude, drive frequency and, if applicable, setpoint, chosen with the following considerations in mind:

1. Both eigenmodes are in the attractive mode, that is to say that the phase shift of both modes is positive, implying both eigenmode frequencies have been shifted negatively by the tip-sample interactions. Generally, this requires a small amplitude for the second eigenmode.

2. The fundamental eigenmode remains attractive while the second eigenmode is in a state where the tip-sample interactions cause it to be in both attractive and repulsive mode as it is positioned relative to the surface.

3. The fundamental eigenmode is in an attractive mode and the second eiegenmode is in a repulsive mode.

4. In the absence of any second mode excitation, the first eigenmode is interacting with the surface in the attractive mode. After the second eigenmode is excited, the first eigenmode is in a repulsive mode. This change is induced by the addition of the second eigenmode energy. The second eigenmode is in a state where the tip-sample interactions cause it to be attractive and/or repulsive.

5. The first eigenmode is in a repulsive mode and the second mode is in a repulsive mode.

Figure 4:
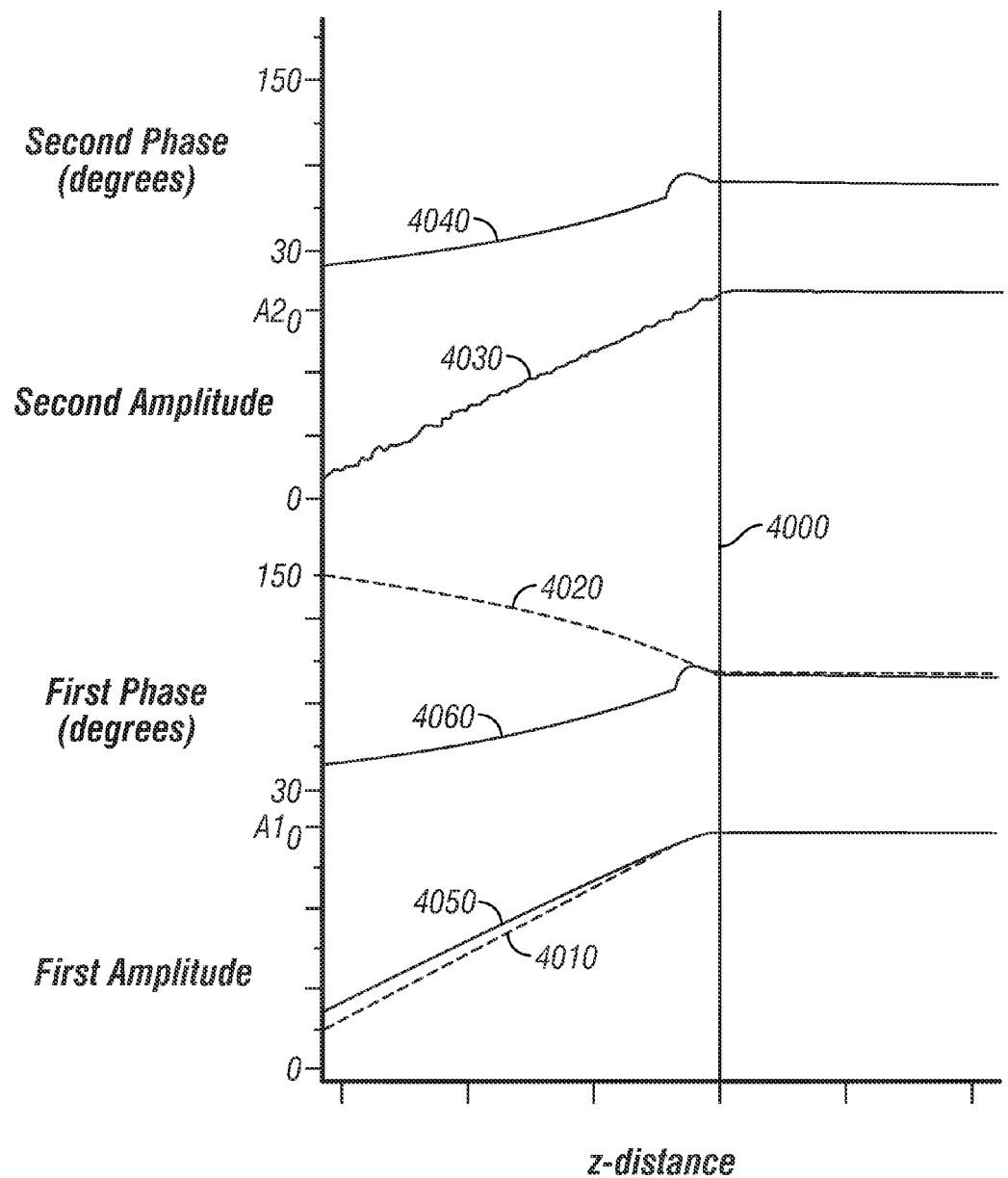
FIG. 4 Phase and amplitude shifts of the fundamental eigenmode with and without the second eigenmode being driven.

The transition in the first mode response from attractive to repulsive mode which is induced by the second mode excitation is illustrated in FIG. 4, where the amplitude and phase of the first and second modes are plotted as a function of the distance between the base of the cantilever and the sample surface. The point where the cantilever tip begins to interact significantly with the surface is indicated with a solid line 4000. The two curves in the lower half of FIG. 4 show that the amplitude 4010 of the fundamental of a cantilever decreases as the cantilever starts to interact with the surface and the associated phase 4020 shows a positive shift, consistent with overall attractive interactions. For these curves, the second mode is not excited and therefore the second mode amplitude is zero and the amplitude and phase are not shown. The second mode amplitude 4030 and phase 4040 when this mode is excited are plotted in the upper half of FIG. 4. Excitation of the second mode induces a notable change in the fundamental mode amplitude 4050 and, more strikingly, the fundamental mode phase 4060. The fundamental mode phase 4060 in fact shows a brief positive excursion, but then transitions to a negative phase shift, indicating an overall repulsive interaction between the tip and sample. The free amplitude 4050 of the first mode is virtually identical in both cases, the only difference in the measurement is the addition of energy exciting the higher oscillatory mode. This excitation is sufficient to drive the fundamental mode into overall repulsive interaction with the sample surface. The phase curve of the second mode indicates that it is also interacting overall repulsively with the sample surface.

More complicated feedback schemes can also be envisioned. For example, one of the eigenmode signals can be used for topographical feedback while the other signals could be used in other feedback loops. An example would be that $A_1$ is used to control the tip-sample separation while a separate feedback loop is used to keep $A_2$ at an essentially constant value rather than allowing it to range freely over many values. A similar feedback loop could be used to keep the phase of the second frequency drive $p_2$ at a predetermined value with or without the feedback loop on $A_2$ being implemented.

As another example of yet another type of feedback that could be used, Q-control can also be used in connection with any of the techniques for using the aforesaid method. Using Q-control on any or all of the modes employed can enhance their sensitivity to the tip-sample forces and therefore mechanical or other properties of the sample. It can also be used to change the response time of the modes employed which may be advantageous for more rapidly imaging a sample. For example, the value of Q for one mode could be increased and the value for another decreased. This may enhance the result of mixed attractive/repulsive mode imaging because it is generally easier to keep one eigenmode interacting with the sample in repulsive mode with a reduced Q-value or, conversely, in attractive mode with an enhanced Q-value. By reducing the Q-value of the lowest mode and enhancing the Q-value of the next mode, it is possible to encourage the mixed mode operation of the cantilever; the zeroth mode will be in repulsive mode while the first mode will more likely remain in attractive mode. Q-control can be implemented using analog, digital or hybrid analog-digital electronics. It can be accomplished using an integrated control system such as that in the Asylum Research Corporation MFP-3D Controller or by after-market modules such as the nanoAnalytics Q-box.

In addition to driving the cantilever at or near more than one eigenmode, it is possible to also excite the cantilever at or near one or more harmonics and/or one or more eigenmodes. It has been known for some time that nonlinear interactions between the tip and the sample can transfer energy into cantilever harmonics. In some cases this energy transfer can be large but it is usually quite small, on the order of a percent or less of the energy in the eigenmode. Because of this, the amplitude of motion at a harmonic, even in the presence of significant nonlinear coupling is usually quite small. Using the methods described here, it is possible to enhance the contrast of these harmonics by directly driving the cantilever at the frequency of the harmonic. To further enhance the contrast of this imaging technique it is useful to adjust the phase of the higher frequency drive relative to that of the lower. This method improves the contrast of both conventional cantilevers and the specially engineered "harmonic" cantilevers.

On many samples, the results of imaging with the present invention are similar to, and in some cases superior to, the results of conventional phase imaging. However, while phase imaging often requires a judicious choice of setpoint and drive amplitude to maximize the phase contrast, the method of the present invention exhibits high contrast over a much wider range of imaging parameters. Moreover, the method also works in fluid and vacuum, as well as air and the higher flexural modes show unexpected and intriguing contrast in those environments, even on samples such as DNA and cells that have been imaged numerous times before using more conventional techniques.

Figure 5D:
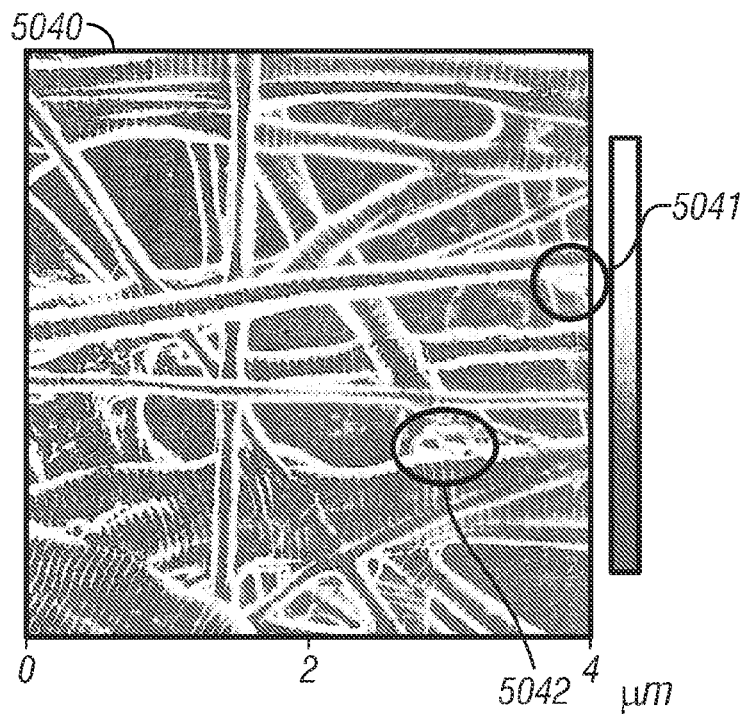
FIG. 5 Images of collagen fibers taken with the preferred embodiment.
Figure 5E:
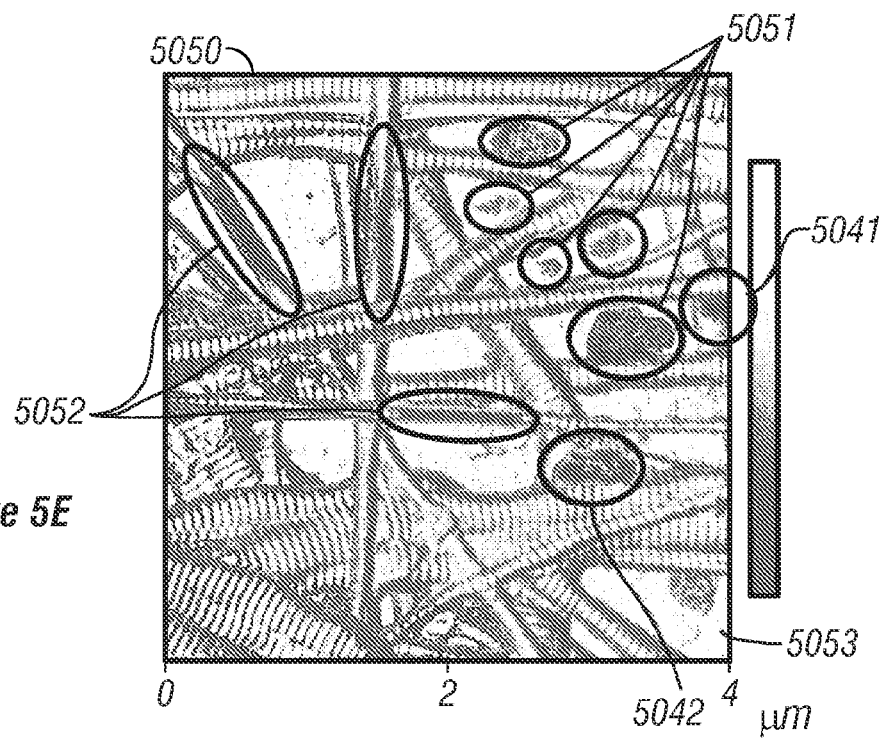

The superior results of imaging with the present invention may be seen from an inspection of the images. An example of is shown in FIG. 5. For this example, the FIG. 1 apparatus was operated using the fundamental eigenmode amplitude as the error signal and the second eigenmode as a carry-along signal. The topography image 5010 in FIG. 5 shows collagen fibers on a glass surface, an image typical of results with conventional AC mode from similar samples. The fundamental eigenmode amplitude image 5020 is relatively similar, consistent with the fundamental eigenmode amplitude being used in the feedback loop. The fundamental eigenmode phase channel image 5030 shows some contrast corresponding to edges in the topography image. This is consistent with the interaction being more attractive at these regions, again to be expected from surface energy considerations (larger areas in proximity will have larger long-range attractive forces). Since the fundamental eigenmode amplitude is being held relatively constant and there is a relationship between the amplitude and phase, the phase will be constrained, subject to energy balance and the feedback loop that is operating to keep the amplitude constant. The second eigenmode amplitude image 5040 shows contrast that is similar to the fundamental eigenmode phase image 5030. However, there are some differences, especially over regions thought to be contaminants 5041 and 5042. Finally, the second eigenmode phase image 5050 shows the most surprisingly large amount of contrast. The background substrate 5053 shows a bright, positive phase contrast. The putative contaminant patches, 5041, 5042 and 5051 show strikingly dark, negative phase shift contrast. Finally, regions where the collagen fibers are suspended 5052 show dark, negative phase contrast. In these regions, the suspended collagen fibers are presumably absorbing some of the vibrational energy of the second eigenmode amplitude and thus, changing the response.

When an AFM is operated in conventional AC mode with phase detection, the cantilever amplitude is maintained constant and used as a feedback signal., Accordingly, the values of the signal used in the loop are constrained not only by energy balance but also by the feedback loop. Furthermore, if the amplitude of the cantilever is constrained, so will the phase be constrained. In conventional AC mode it is not unusual for the amplitude to vary by a very small amount, depending on the gains of the loop. This means that, even if there are mechanical properties of the sample that might lead to increased dissipation or a frequency shift of the cantilever, the Z-feedback loop in part corrects for these changes in contrast and thus in this sense, avoids presenting the contrast to the user.

If the technique for using the present invention involves a mode that is excited but not used in the feedback loop, there will be no explicit constraints on the behavior of this mode. Instead it will range freely over many values of the amplitude and phase, constrained only by energy balance. That is to say, the energy that is used to excite the cantilever motion must be balanced by the energy lost to the tip-sample interactions and the intrinsic dissipation of the cantilever. This may explain the enhanced contrast we observe in images generated with the techniques of the present invention.

Figure 6:
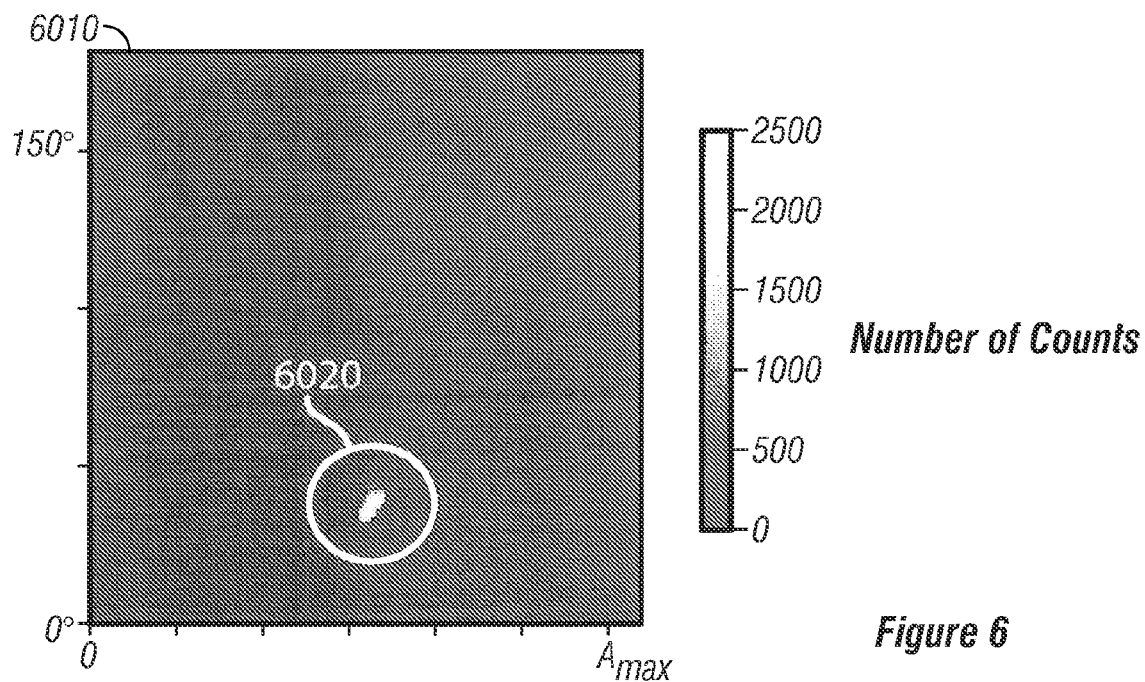
FIGS. 6 and 7 show Two dimensional histogram plots of the amplitude and phase for the first and second eigenmodes.
Figure 7:
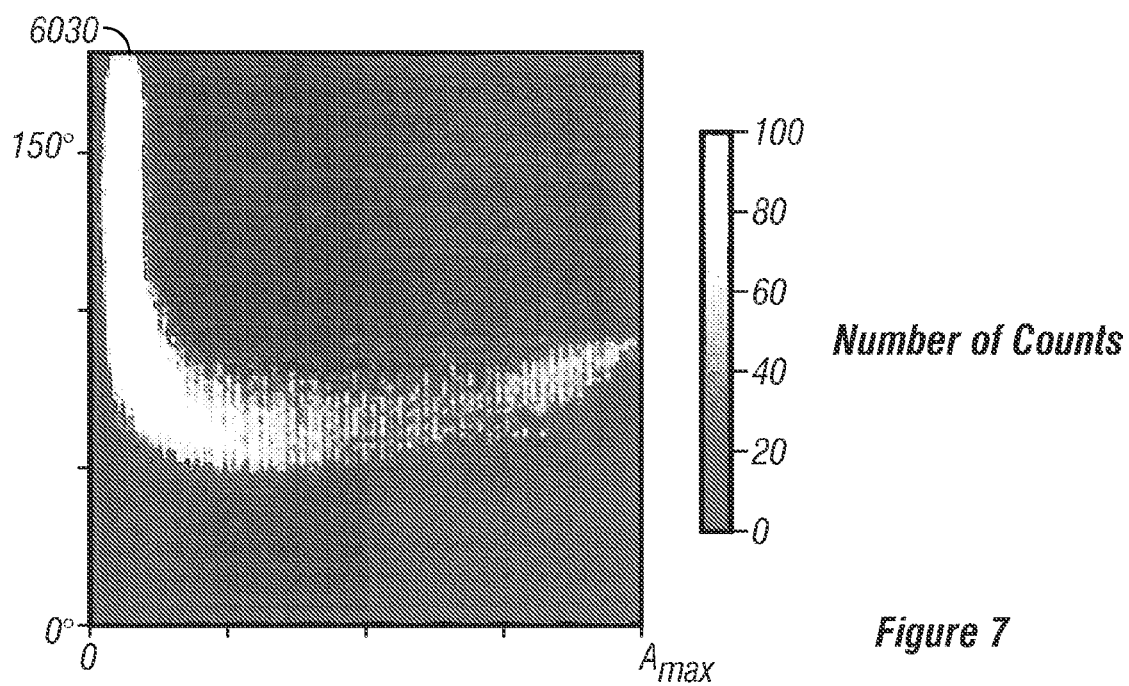

FIG. 6 demonstrates this idea more explicitly. The first image 6010 is an image of the number of pixels at different amplitudes (horizontal axis) and phases (vertical axis) in the fundamental eigenmode data for the collagen sample of FIG. 5. As expected, the amplitude values are constrained to narrow range of ~0.6Amax by the Z-feedback loop. Constraining the amplitude values in turn, limits the values that the phase can take on to the narrow range around 25°. Thus, when counts at are plotted, there is a bright spot 6020 with only small variations. Small variations in turn imply limited contrast. The second image 6030 plots the number of pixels at different amplitudes and phases of the second eigenmode for the collagen sample. Here the eigenmode was not constrained by a feedback loop and it varies from ~Amax to close to zero. Similarly, the phase ranges over many values. This freedom allows greatly increased contrast in the second eigenmode images.

The present invention may also be used in apparatus that induce motion in the cantilever other than through a piezoelectric actuator. These could include direct electric driving of the cantilever ("active cantilevers"), magnetic actuation schemes, ultrasonic excitations, scanning Kelvin probe and electrostatic actuation schemes.

Direct electric driving of the cantilever ("active cantilevers") using the present invention has several advantages over conventional piezo force microscopy where the cantilever is generally scanned over the sample in contact mode and the cantilever voltage is modulated in a manner to excite motion in the sample which in turn causes the cantilever to oscillate.

Figure 2:
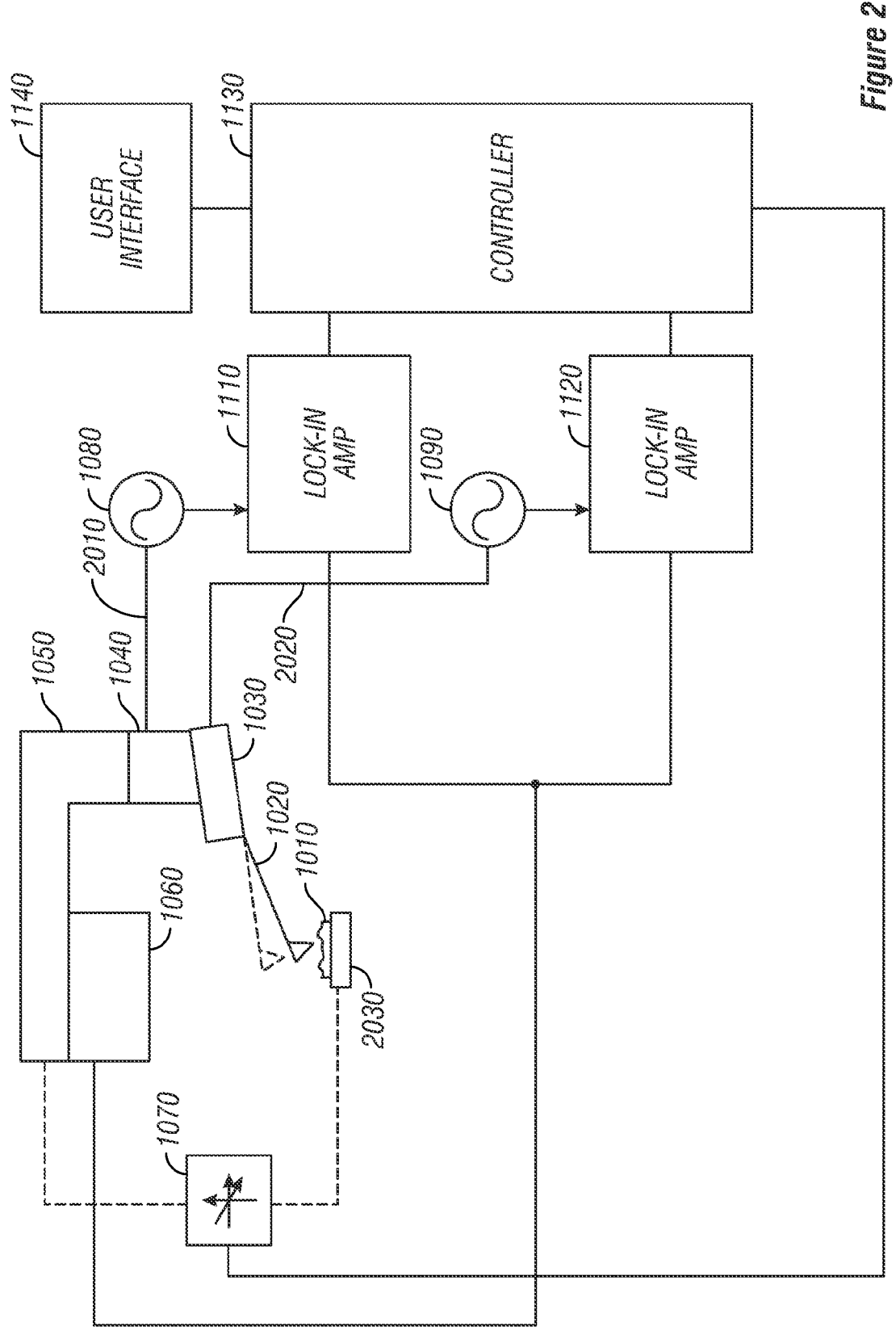
FIG. 2 Apparatus used for exciting voltage dependent motion in the cantilever probe.

FIG. 2 is a block diagram of a preferred embodiment of an apparatus for using the present invention with an active cantilever. This apparatus has similarities to that shown in FIG. 1, as well as differences. In the FIG. 2 apparatus, like the FIG. 1 apparatus, one frequency source 1080 is used to excite motion of the cantilever probe 1020 through a mechanical actuator 1040, preferably a piezoelectric actuator, but other methods to induce cantilever motion known to those versed in the art could also be used, which drives the chip 1030 of the cantilever probe 1020, However, in the FIG. 2 apparatus, the frequency source 1080 communicates directly 2010 with the actuator 1040 instead of being summed together with the second frequency source 1090, as in the FIG. 1 apparatus. The second frequency source 1090 in the FIG. 2 apparatus is used to vary the potential of the cantilever probe 1020 which in turn causes the sample 1010 to excite motion in the cantilever probe 1020 at a different eigenmode than that being excited by the first oscillator 1080. The resulting motion of the cantilever probe 1020 interacting with the sample 1010 will contain information on the sample topography and other properties at the eigenmode excited by the first frequency source 1080 and information regarding the voltage dependent properties of the sample at the eigenmode excited by the second frequency 1090. The sample holder 2030 can optionally be held at a potential, or at ground to enhance the effect.

In one method of using the FIG. 2 apparatus, the amplitude of the cantilever at the frequency of the first source 1080 used as the error signal. The amplitude and phase (or in-phase and quadrature components) at the frequency of the second source 1090 or a harmonic thereof will contain information about the motion of the sample and therefore the voltage dependent properties of the sample. One example of these properties is the piezo-response of the sample.

Figure 3:
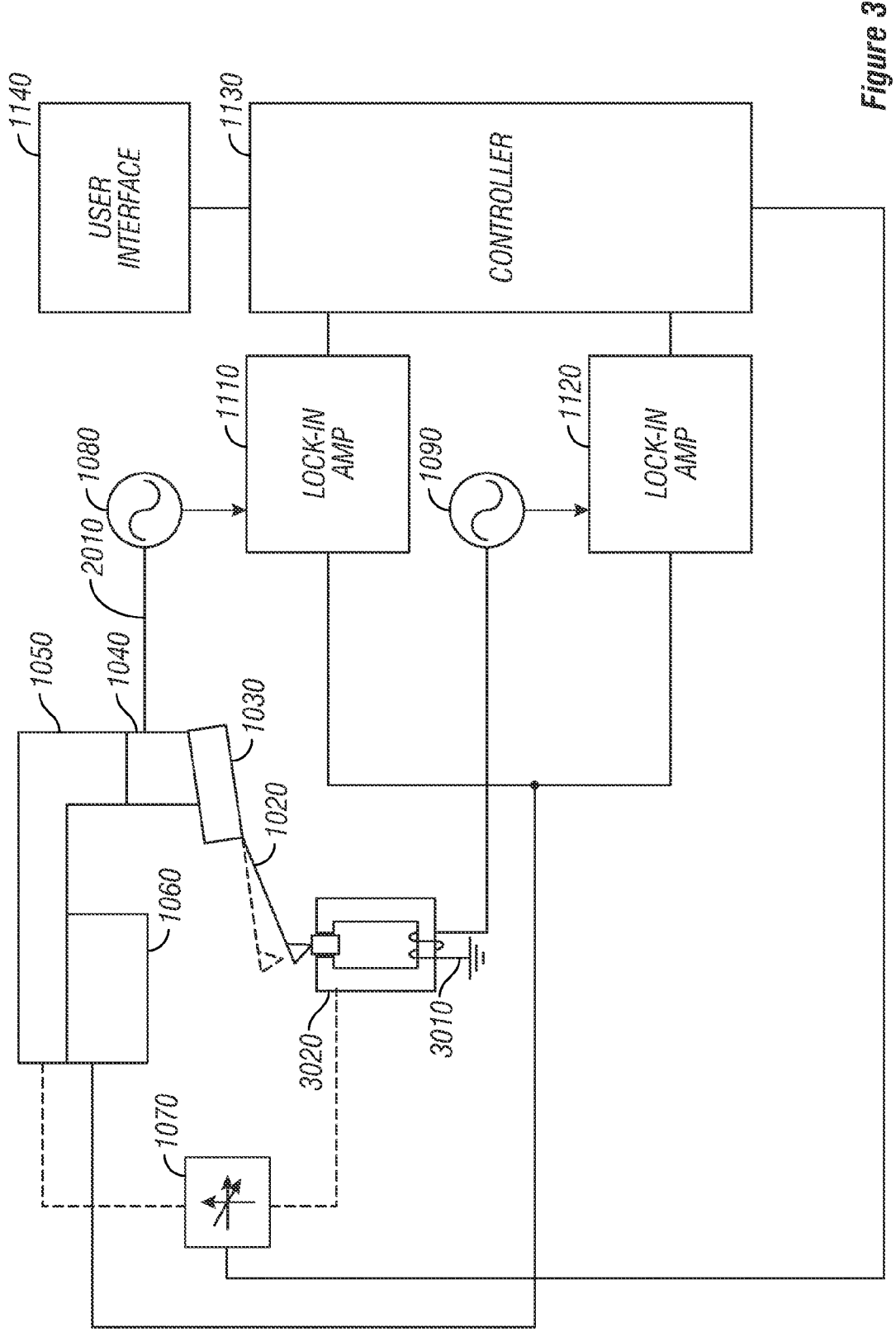
FIG. 3 Arrangement used for probing an active device.

FIG. 3 is a block diagram of a preferred embodiment of an apparatus for using the present invention with the second frequency source modulating a magnetic field that changes a property of the surface. In the FIG. 3 apparatus, the situation with the first frequency source 1080 is identical to the situation in the FIG. 2 apparatus. Instead of the second frequency source 1090 being used to vary the potential of the cantilever probe 1020 as with the FIG. 2 apparatus, in the FIG. 3 apparatus the second frequency source 1090 modulates the current through an excitation coil 3010 which in turn modulates the magnetic state of a magnetic circuit element 3020. This element could be used to modulate the field near an active sample 3030 (not shown) or the excitation coil 3010 and magnetic circuit element 3020 could comprise the sample, as in the case of a magnetic recording head.

The FIG. 3 apparatus can be used with any other sort of 'active' sample where the interaction between the cantilever and the sample can be modulated at or near one or more of the cantilever flexural resonances by one of the frequency sources 1080 or 1090. This could also be extended to high frequency measurements such as described in Proksch et al., Appl. Phys. Lett., vol. (1999). Instead of the modulation described in that paper, the envelope of the high frequency carrier could be driven with a harmonic of one or more flexural resonances. This method of measuring signals other than topographic has the advantage of requiring only one pass to complete as opposed to "LiftMode" or Nap mode that require spatially separated measurements of the topographic and other signals.

Another example of a preferred embodiment of an apparatus and method for using the present invention is from the field of ultrasonic force microscopy. In this embodiment, a high frequency carrier is amplitude modulated and used to either directly drive the sample or to drive it using the cantilever as a waveguide. The cantilever deflection provides a rectified measure of the sample response at the carrier frequency.

This embodiment is similar to the conventional force modulation technique where the cantilever is typically operated in contact mode. As with other contact mode techniques, however, the force modulation technique has the disadvantage that the forces acting between the tip and the sample can be quite significant, often resulting in damage to the tip or sample and reduced spatial resolution.

However, because the ultrasonic force embodiment described here is an AC imaging method, the damage to the tip and/or sample is significantly reduced as compared to contact mode techniques. Thus, one or more eigenmodes are used for the Z-feedback loop, taking the place of the contact mode feedback loop, and one or more additional eigenmodes can be used to measure the high frequency properties of the sample.

The described embodiments of the invention are only considered to be preferred and illustrative of the inventive concept. The scope of the invention is not to be restricted to such embodiments. Various and numerous other arrangements may be devised by one skilled in the art without departing from the spirit and scope of the invention.

The invention claimed is:

1. An atomic force microscope operating to determine voltage dependent properties of a sample, comprising:
   a cantilever having a probe tip;
   an actuator for the cantilever, that is driven to move said cantilever;
   a first frequency source driving said actuator for the cantilever at a first frequency;
   a second frequency source varying an electrical potential of the cantilever relative to the sample at a second frequency, different than the first frequency; and a detector detecting cantilever response information to the sample at both values related to said first frequency and said second frequency, wherein said detector measures an amplitude and phase of first and second eigenmodes of the cantilever as a measured characteristics of the sample.

2. The microscope as in claim 1, further comprising a connection for grounding said sample.

3. The microscope as in claim 1, wherein said actuator drives said cantilever to avoid touching the sample.

4. The microscope as in claim 1, wherein said cantilever response information includes values at said first and/or second frequencies or harmonics thereof.

5. The microscope as in claim 1, wherein said actuator drives the cantilever at or near a flexural resonance thereof.

6. The microscope as in claim 1, wherein said detector measures an amplitude of the cantilever at the first frequency as an error signal, and also measures information at said second frequency or a harmonic thereof to represent voltage dependent properties of the sample.

7. A method of determining both topographic and material dependent properties of a sample, comprising:
   exciting a cantilever probe at a first frequency using a first frequency source driving a first actuator to drive the cantilever at said first frequency;
   using a second frequency source at a second frequency different than said first frequency, to vary an electrical potential of said cantilever probe and thereby cause said sample to excite motion in said cantilever probe;
   detecting an interaction of said cantilever probe with said sample at values related to said first frequency and said second frequency; and
   using interaction information indicative of said interaction, determining topographic and other information about said sample and simultaneously determining voltage dependent and other material properties of the sample,
   wherein said detecting comprises measuring an amplitude and phase of first and second eigenmodes of the cantilever to provide information about a response of said sample interacting with a tip of the cantilever probe.

8. A method as in claim 7, wherein said second frequency varies a voltage on the cantilever probe relative to the sample.

9. A method as in claim 8, further comprising grounding said sample.

10. A method as in claim 7, wherein said second frequency varies a magnetic field on the sample.

11. A method as in claim 7, wherein said cantilever is driven to avoid touching the sample.

12. A method as in claim 7, wherein said interaction response information includes values at said first and/or second frequencies or harmonics thereof.

13. A method as in claim 7, wherein said second frequency varies an ultrasonic field on the sample.

14. A method as in claim 13, further comprising using said cantilever as a waveguide for applying an ultrasonic wave to the sample an ultrasonic field.

15. An atomic force microscope, comprising:
   a sample holder, with a surface that holds a sample;
   a cantilever probe, having a tip that may be located near said surface;
   a first actuator, which drives the cantilever probe at a first frequency;
   a first frequency source controlling said first actuator;
   a second frequency source at a second frequency different than the first frequency, varying an electrical potential of the cantilever probe and thereby causing said sample to excite motion in said cantilever probe; and
   a detector, detecting a response of said cantilever probe interacting with said sample at values related to said first frequency and said second frequency, said detector producing topographic and other information about said sample, and also voltage dependent and other material properties of said-sample, wherein said detecting comprises measuring an amplitude and phase of first and second eigenmodes of the cantilever to provide information about the response, where the response is of said sample interacting with a tip of the cantilever probe.

16. A microscope as in claim 15, further comprising a connection grounding said sample holder.

17. A microscope as in claim 15, wherein said second frequency varies a voltage on the cantilever probe relative to the sample.

18. A microscope as in claim 15, wherein interaction information includes values at said first and/or second frequencies or harmonics thereof.

19. A microscope as in claim 15, wherein said detecting comprises measuring an amplitude of the cantilever at said first frequency as an error signal, and measuring information at said second frequency or a harmonic thereof to represent voltage dependent and other material properties of the sample.

* * * * *